United States Patent
Hall et al.

(10) Patent No.: US 10,552,323 B1
(45) Date of Patent: Feb. 4, 2020

(54) CACHE FLUSH METHOD AND APPARATUS (71) Applicant: Apple Inc., Cupertino, CA (US)

(72) Inventors: Ronald P. Hall, Cedar Park, TX (US);
Todd A. Venton, Austin, TX (US);
Jonathan Y. Tong, Austin, TX (US);
David E. Kroesche, Austin, TX (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/126,812

(22) Filed: Sep. 10, 2018

(51) Int. Cl.
| | |
|---|---|
| G06F 12/08 | (2016.01) |
| G06F 12/0804 | (2016.01) |
| G06F 12/0891 | (2016.01) |
| G06F 9/30 | (2018.01) |
| G06F 9/38 | (2018.01) |
| G06F 12/0866 | (2016.01) |

(52) U.S. Cl.
CPC ...... *G06F 12/0804* (2013.01); *G06F 9/30083* (2013.01); *G06F 9/3857* (2013.01); *G06F 12/0866* (2013.01); *G06F 12/0891* (2013.01)

(58) Field of Classification Search
CPC ............. G06F 12/0808; G06F 12/0811; G06F 12/0868; G06F 12/0891
See application file for complete search history.

(56) References Cited

U.S. PATENT DOCUMENTS

| | | | |
|---|---|---|---|
| 6,389,546 B1 * | 5/2002 | Kano | G06F 1/30 713/340 |
| 6,629,268 B1 | 9/2003 | Arimilli et al. | |
| 7,356,647 B1 | 4/2008 | Andrighetti et al. | |
| 7,840,753 B1 * | 11/2010 | Booth | G06F 3/0611 711/113 |
| 9,563,557 B2 * | 2/2017 | Kumar | G06F 12/0804 |
| 10,152,393 B2 * | 12/2018 | Kelly | G06F 11/1441 |
| 2010/0318725 A1 * | 12/2010 | Kwon | G06F 11/1441 711/103 |
| 2013/0346683 A1 * | 12/2013 | Walker | G06F 12/0804 711/105 |
| 2016/0364236 A1 | 12/2016 | Moudgill et al. | |
| 2018/0060231 A1 * | 3/2018 | Kelly | G06F 11/1441 |
| 2019/0042418 A1 * | 2/2019 | Dutta | G06F 1/24 |
| 2019/0129836 A1 * | 5/2019 | Boyle | G06F 12/0246 |
| 2019/0266098 A1 * | 8/2019 | Torchalski | G06F 12/0891 |

OTHER PUBLICATIONS

Chris Gniady, Y Charlie Hu, and Yung-Hsiang Lu, "Program Counter Based Techniques for Dynamic Power Management", 2004, Purdue University, IEEE, 10th International Symposium on High Performance Computer Architecture. (Year: 2004).*

Intel 64 and IA-32 Architectures Software Developer's Manual, Instruction Set Reference, V-Z, May 2018, vol. 2C., 5-552-5-553.

* cited by examiner

*Primary Examiner* — Khoa D Doan
(74) *Attorney, Agent, or Firm* — Kowert, Hood, Munyon, Rankin & Goetzel, P.C.; Erik A. Heter (57) ABSTRACT

Various embodiments of a method and apparatus for flushing a cache are disclosed. In a system, a cache memory is accessible by an execution circuit. The execution circuit executes instructions and may utilize data and/or instructions stored in the cache. A flush circuit is also coupled to the cache. Responsive to execution of a power down instruction by the execution circuit, the flush circuit performs a cache flush. If a control state is asserted in a control register, the flush circuit generates a dummy event upon completing the cache flush. Responsive to generating the dummy event, a processor core that includes the execution circuit is inhibited from being powered down.

20 Claims, 7 Drawing Sheets

CACHE FLUSH METHOD AND APPARATUS

BACKGROUND

Technical Field

This disclosure is directed to cache subsystems, and more particularly, to the flushing of a cache memory in a cache subsystem.

Description of the Related Art

Modern processors often times utilize cache memories for faster access to needed information. A cache memory allows for information to be stored in a location closer and more accessible to execution units, and may thereby enable better performance. Accordingly, the utilization of a cache memory may obviate the need to access main system memory, which can otherwise cause a processor to incur a performance penalty. Cache memories may be implemented at various levels. For example a level one (or "L1") cache may be that which is closest to the processor, while a level two (or "L2") is a next level of cache memory, and so on.

From time to time cached information may effectively be removed in part or in full. This removal of information from a cache is commonly referred to as a "flush" of the cache. A flush may be performed for various reasons. For example, in multi-threaded processor architectures, the changing from one thread to another may include flushing of at least one level of a cache. The flushing of a cache may be performed in various ways, such as executing software instructions that cause the information stored in various parts of the cache to be effectively removed.

SUMMARY

Various embodiments of a method and apparatus for flushing a cache are disclosed. In one embodiment, a cache memory is accessible by an execution unit. The execution unit executes instructions and may utilize data and/or instructions stored in the cache. A flush circuit is also coupled to the cache. Responsive to execution of a power down instruction by the execution unit, the flush circuit performs a cache flush. If a control state is asserted in a control register, the flush circuit generates a dummy event upon completing the cache flush. Responsive to generating the dummy event, a processor core that includes the execution unit is inhibited from being powered down.

In some embodiments, a cache flush may be initiated by the execution of a register update instruction. A control state is asserted in a control register responsive to execution of the register update instruction, while a status state is asserted in a status register. When the power down instruction is executed with the control state being asserted, the cache flush circuit performs the cache flush, and generates the dummy event. Upon completing the cache flush, the status state in the status register is de-asserted to indicate the cache flush is complete.

The various method and apparatus embodiments disclosed herein may allow for cache flushes to be performed faster than previous embodiments which rely on software instructions to perform a cache flush in the absence of powering down a processor core. Whereas previous software-based cache flushes may require the execution of a significant number of cache flush instructions (e.g., one instruction executed per line), the various embodiments disclosed herein effectively make the cache flush circuit visible to software using a single instruction. Thereafter, the cache flush circuit may perform a flush of the cache in less time than consumed by relying solely on the execution of cache flush instructions.

BRIEF DESCRIPTION OF THE DRAWINGS

The following detailed description makes reference to the accompanying drawings, which are now briefly described.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation [entity] configured to [perform one or more tasks] is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

In the following description, numerous specific details are set forth to provide a thorough understanding of the disclosed embodiments. One having ordinary skill in the art, however, should recognize that aspects of disclosed embodiments might be practiced without these specific details. In some instances, well-known circuits, structures, signals, computer program instruction, and techniques have not been shown in detail to avoid obscuring the disclosed embodiments.

DETAILED DESCRIPTION OF EMBODIMENTS

The present disclosure is directed to various method and apparatus embodiments for flushing a cache. Typically, a cache may be flushed in one of two different ways, one software-based and one hardware-based. The hardware-based method in such embodiments is used when, e.g., a processor core is to be powered down or put in a low power mode, using circuitry for flushing the cache. This circuitry is not visible to software. The software-based method in such embodiments is performed by executing a series of cache flush instructions, flushing the cache e.g., on a line-by-line basis. The software-based method can be used in, e.g., a context switch, but can consume a significant amount of time and thus incurs a performance penalty. The various method and apparatus embodiments disclosed herein make a cache flush circuit visible to software and thus allow its use when no power down is to be performed. Accordingly, utilization of the cache flush circuit may allow for significantly faster cache flushes than are possible by executing multiple cache flush instructions.

Figure 1:
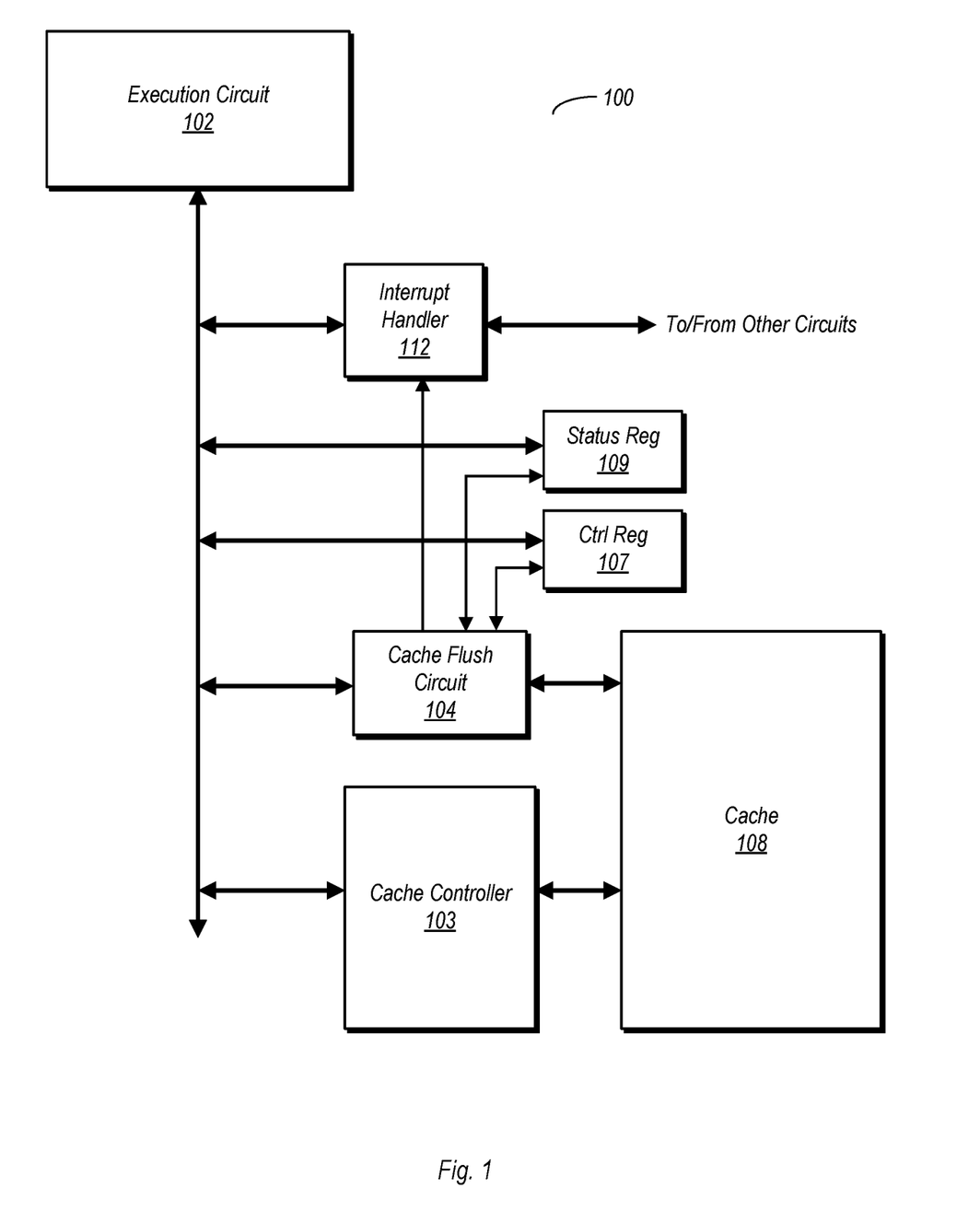
FIG. 1 is a block diagram of one embodiment of an apparatus having an execution unit and a cache subsystem.

FIG. 1 is a block diagram of one embodiment of an apparatus having an execution circuit and a cache subsystem. In the embodiment shown, apparatus 100 may be fully or in part implemented within a processor core. Apparatus 100 includes an execution unit 102 and a cache subsystem that includes cache controller 103, cache flush circuit 104, and cache 108. Apparatus 100 also includes a control register 107, a status register 108, and an interrupt handler 112.

In one embodiment, apparatus 100 is a processor core including an execution unit configured to execute instructions, a cache configured to store information accessible by the execution circuit, and a flush circuit configured to flush the cache responsive to execution of a power down instruction the execution unit. Apparatus 100 may include, or may be coupled to, a power management circuit configured to initiate a procedure to power down the processor core responsive to execution of the power down instruction. The cache flush circuit is further configured to generate a dummy event responsive to completing flushing of the cache and determining that a control state is set in a control register. The power management circuit is configured to abort the procedure to power down the processor core responsive to the dummy event. In one embodiment, the dummy event is an interrupt. Flushing the cache by cache flush circuit may include causing invalidation of at least a subset of a plurality of cache lines in the cache and/or cause any modified data stored in the cache to be written to a lower level memory (e.g., a lower level cache or a system memory, as discussed below in reference to FIG. 2). The cache flush circuit may also cause a reset of the control state in the control register responsive to completing the cache flush and cause a reset of the status state in the status register responsive to completing the cache flush.

Cache 108 may be a cache at any level (e.g., L1, or level one; L2, etc.) within a memory hierarchy, and may store instructions and/or data. Cache flush circuit 104 in the embodiment shown performs flushes of cache 108. Cache 108 is configured to store a plurality of cache lines, and during a cache flush, the flush circuit 104 is configured to, during flushing of the cache, invalidate at least a subset of the plurality of cache lines. Furthermore, during a flush, cache flush circuit 104 of one embodiment (e.g., where the cache is a writeback cache) causes any modified stored data in the cache to be written to a lower level memory in a memory hierarchy. In other cache embodiments (e.g., writethrough), any need for performing a write back of modified data may be obviated. In some embodiments, a cache flush may also include overwriting information stored in the cache (e.g., writing all logic zeros).

Execution circuit 102 in the embodiment shown executes instructions for various software entities operating on a computer system that includes apparatus 100. In some embodiments, execution circuit 102 may include multiple execution units, e.g., one for integer data, one of floating point data, and so on. As part of the execution of instructions, execution unit 102 may access data stored in cache 108, via cache controller 103.

From time to time, cache 108 may be flushed (e.g., data stored therein fully or partly removed/evicted). In the embodiment shown, execution circuit 102 may execute a register update instruction to initiate the cache flush. As used herein, the register update instruction may be any type of instruction capable of updating/changing information stored in control register 107. Execution circuit 102 thus causes the control state (in control register 107) to be asserted responsive to execution of the register update instruction. Asserting the control state may include, for example, setting or clearing one or more bits in control register 107. In the embodiment shown, execution of the register update instruction initiates a procedure that results in a flush of cache 108 by cache flush circuit 104, while asserting the control state in control register 107 indicates that, upon completing the cache flush, the processor core that includes execution circuit 102 (and may include any of the other components shown in FIG. 1) is not to be powered down.

In some embodiments, control register 107 may store information in addition to the control state. For example, if cache 108 is to be only partly flushed, control register 107 may store information indicating the portion upon which the flush is to be performed. In another example, if the flush is to include overwriting of the data in the cache (e.g., overwriting with all zeros when the cache is to be flushed for security reasons), an indication of the same may be stored in control register 107. While control register 107 may be implemented as a discrete register in one embodiment, other embodiments are possible and contemplated in which control register 107 is implemented in a set of multiple registers. Generally speaking, control register 107 may be implemented in any suitable fashion.

Apparatus 100 in the embodiment shown also includes a status register 109. Execution circuit 102 is configured to cause a status state to be asserted in status register 109 responsive to execution of a register update instruction. The status state, when asserted, indicates that the flush of the cache is not complete. Accordingly, if the flush of the cache is interrupted for some reason, the asserted status state provides an indication to cache flush circuit 104 that the flush is to be resumed once conditions permit. In one embodiment, software may query status register 109 to determine if the flush is complete. In the event that a cache flush performed by cache flush circuit 104 is aborted, a query by software that determines that the flush was not completed may cause the power down instruction to be re-executed, with flush circuit 104 performing the flush again. Similar to control register 107 discussed above, status register 108 may be implemented as a single register, a set of multiple registers, or generally, any suitable fashion.

Following execution of the register update instruction, a power down instruction is executed by execution circuit 102. Responsive to execution of the power down instruction, cache flush circuit 104 performs the flush of cache 108. The control state in control register 107 is read by cache flush circuit, which indicates that the processor core that includes execution circuit 102 is not to be powered down upon completion of the flush. Accordingly, when cache flush circuit 104 completes the flush of cache 108, a dummy event is generated. In this particular embodiment, the dummy event is an interrupt. The interrupt is conveyed to interrupt handler 112. Although not shown in this particular drawing, a power control circuit may receive an indication from interrupt handler 112 to abort the power down procedure. Thus, the asserting of the control state in control register 107 allows the cache flush circuit 104 to flush cache 108 without requiring the power down of a processor core and/or other circuits.

It is noted that the dummy interrupt is only one possible implementation for a dummy event. For example, embodiments are possible and contemplated in which a dummy event comprises an indication directly sent to a power control circuit to cause a power down procedure to be aborted.

Upon completing the cache flush, cache flush circuit 104 de-asserts the control state in control register 107. Additionally, cache flush circuit 104 is configured to de-assert the status state (in status register 109) responsive to completing flushing of the cache.

In the absence of an executed register update instruction that asserts the control state in the control register, execution of a power down instruction causes cache flush circuit 104 to flush cache 108. In this case however, since the control state is not asserted in control register 107, the power down procedure may by allowed to go to completion once the cache flush is complete.

From the perspective of software, a processor configured as described above may permit software to flush the entire cache by executing, for example, a single register update instruction followed by a power down instruction, as opposed to iterating over a loop of cache flush instructions. By detecting this particular sequence of operations, the processor may perform the hardware-based cache flushing that would ordinarily be performed responsive to a power down instruction alone (or a similar power down event), while suppressing the actual powering down that would ordinarily result.

Figure 2:
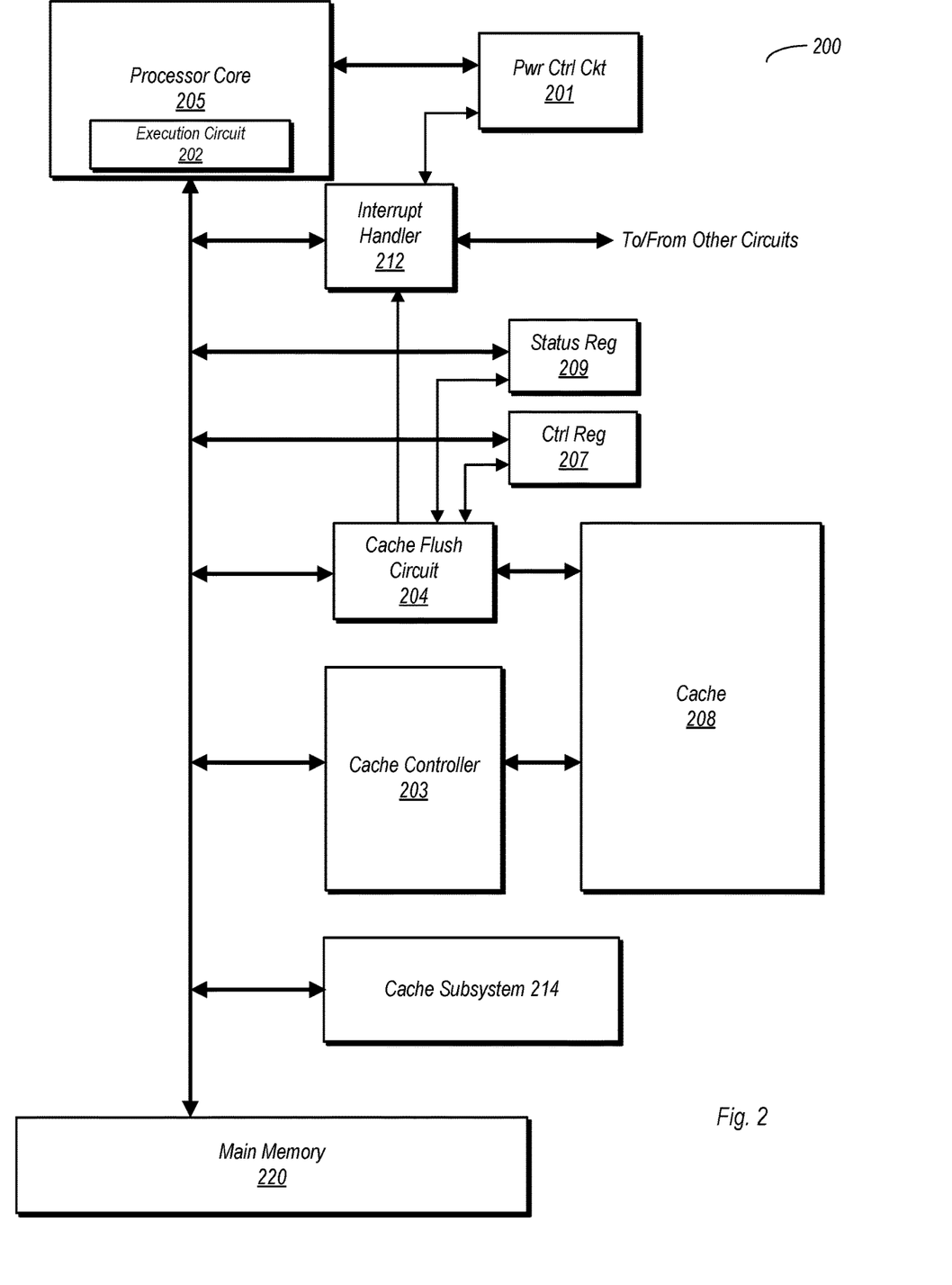
FIG. 2 is a block diagram of one embodiment of a system including a processor and a cache subsystem.

FIG. 2 is a block diagram of one embodiment of a system that may include cache flushing features similar to those discussed with respect to FIG. 1, some of which may be located outside a particular core (e.g., in systems having caches shared by multiple cores) In the embodiment shown, system 200 includes a processor core 205 having an execution unit. Processor core 205 is coupled to multiple cache subsystems, a first one including cache flush circuit 204, cache controller 203, and cache 208. A second cache subsystem in the embodiment shown is cache subsystem 214, which includes a lower level cache (e.g., an L3, whereas cache 208 may be an L2 cache), and may additionally include a cache controller and another instance of a cache flush circuit. Processor 205 is also coupled to main memory 220, although it is understood that a memory controller (not shown) may also be part of this system. It is further understood that processor 205 may itself include at least one cache memory, e.g., an L1 cache (which may in some cases include separate caches for data and instructions). Together, the various levels of cache memory along with main memory 220 form a memory hierarchy.

System 200 also includes a power management circuit (power control circuit 201) configured to initiate a power down procedure responsive to execution of the power down instruction, and further configured to abort the power down procedure responsive to the dummy event. Power control circuit 201 may perform various power control actions, including powering up and powering down various functional circuit blocks, controlling the respective frequencies of clock signals provided to various circuit units, controlling voltage levels, and so on. Generally speaking, power control circuit 201 performs various actions with regard to system 200 to optimize power consumption with respect to system performance.

In the embodiment shown, system 200 also includes interrupt handler 212, status register 209, and control register 207. Each of these functional circuit blocks may perform functions similar to or the same as their counterparts discussed above with reference to FIG. 1. More particularly, control register 207 may store a control state that is asserted responsive to execution of a register update instruction while status register 209 may store a status state responsive to execution of the register update instruction. Cache flush circuit 204 may perform a flush of cache 208 and, when the control state is asserted in control register 207, assert an interrupt to interrupt handler 212 upon completing the flush. Interrupt handler 212 in this embodiment responds to the interrupt from cache flush circuit 204 to cause a power down procedure to be aborted via a signal conveyed to power control circuit 201. Aborting the power down procedure in turn causes the power control circuit 201 to inhibit processor core 205 from being powered down, and may also inhibit the powering down of various functional circuit blocks coupled thereto, including any or all of those shown in FIG. 2.

In performing a flush of a cache, cache flush circuit 204 may perform one or more of the following: causing the control state to be asserted in the control register responsive to execution of a register update instruction, and/or causing a status state to be asserted in a status register responsive to execution of the register update instruction.

Figure 3:
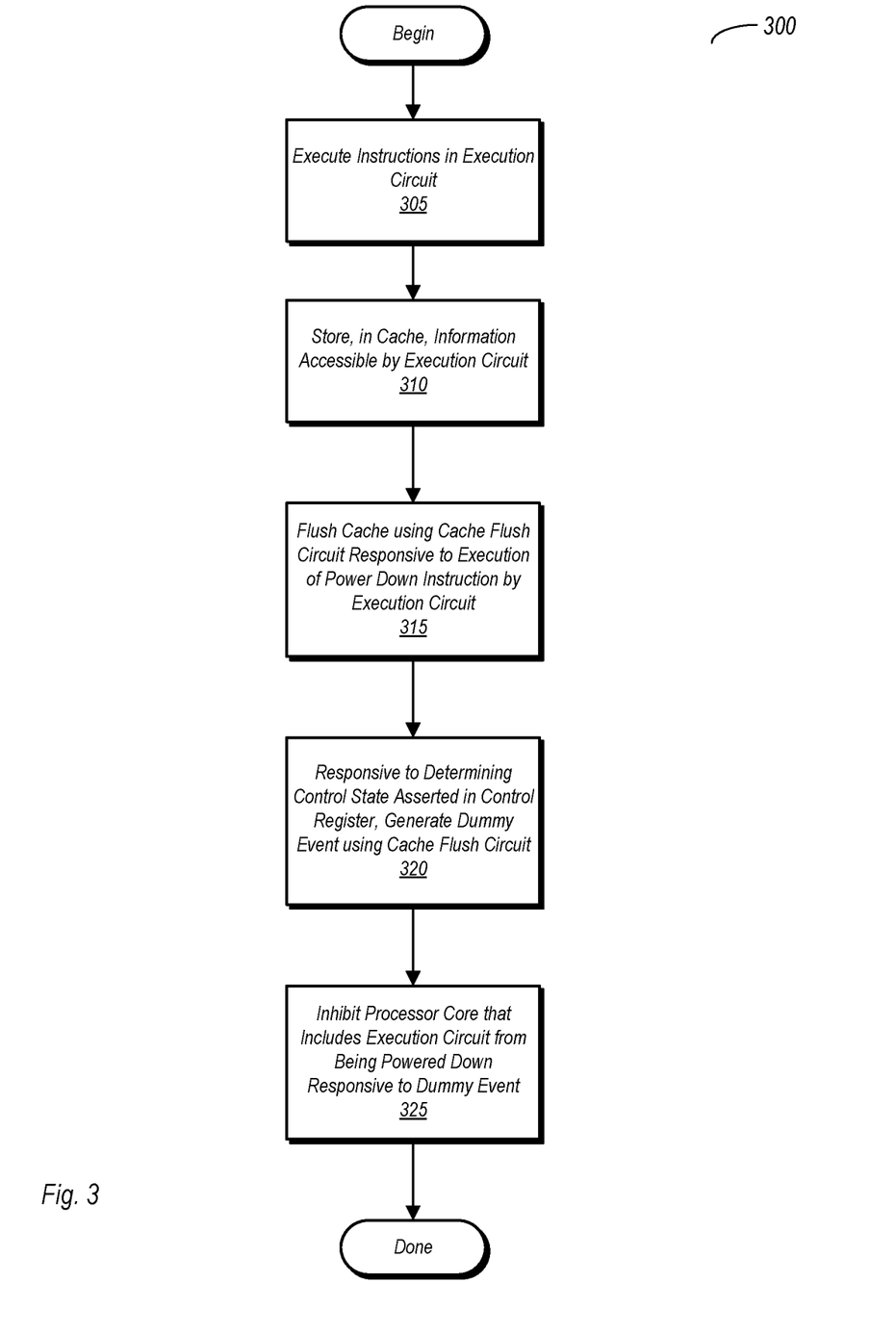
FIG. 3 is a flow diagram illustrating one embodiment of a method for operating a system having a cache flush circuit.

FIG. 3 is a flow diagram illustrating one embodiment of a method for operating a system having a cache flush circuit. Method 300 as shown in FIG. 3 may be performed by the hardware embodiments discussed above with reference to FIGS. 1 and 2. Other hardware embodiments capable of carrying out method 300 are also possible and contemplated, and may thus fall within the scope of this disclosure.

Method 300 includes executing instructions in an execution circuit (block 305), such as one included in a processor core. The method also includes storing, in a cache, information accessible by the execution circuit (block 310). Responsive to execution of a power down instruction by the execution circuit, the method further includes performing a cache flush using a cache flush circuit (block 315). The cache flush circuit also generates a dummy event responsive to determining that a control state is asserted in a control register (block 320). The dummy event may be an interrupt or another signal conveyed to, e.g., a power control circuit. Responsive to the dummy event, method 300 further includes inhibiting a processor core that includes the execution circuit from being powered down (block 325).

Figure 4:
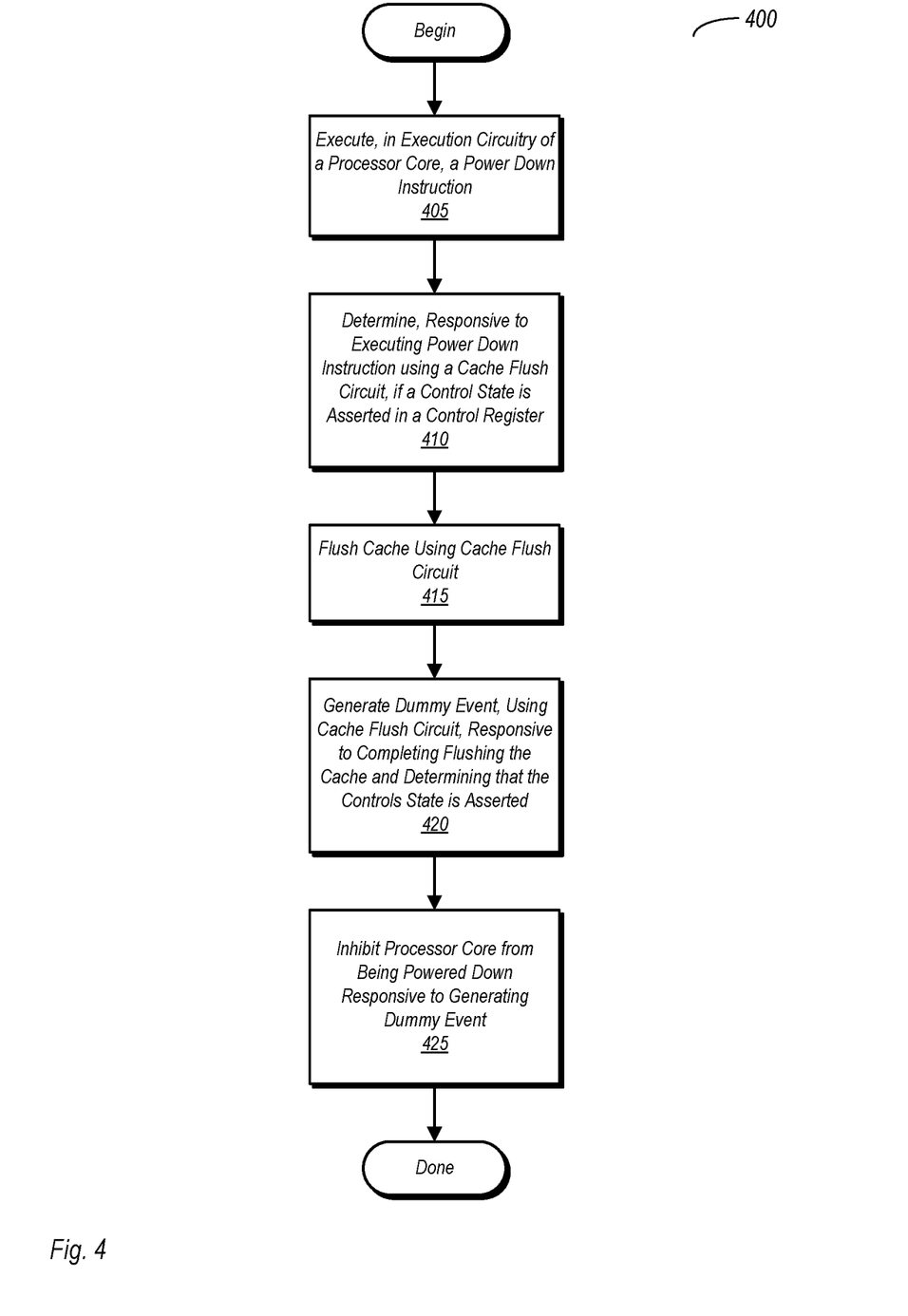
FIG. 4 is a flow diagram illustrating another embodiment of a method for operating a system having a cache flush circuit.

FIG. 4 is a flow diagram illustrating another embodiment of a method for operating a system having a cache flush circuit. Similar to FIG. 3, method 400 of FIG. 4 may be performed by the various hardware embodiments discussed above, as well as additional hardware embodiment not explicitly disclosed herein but nevertheless falling within the scope of this disclosure.

Method 400 includes executing, in execution circuitry of a processor core, a power down instruction (block 405). The method further includes determining, responsive to executing the power down instruction and using a cache flush circuit, if a control state is asserted in a control register (block 410). In addition to using the cache flush circuit to determine if the control state is asserted, the method further includes flushing a cache using the cache flush circuit (block 415). Thereafter, the method includes generating a dummy event, using the cache flush circuit, responsive to completing flushing of the cache and determining that the control state is asserted (block 420). Finally, method 400 includes inhibiting the processor core from being powered down responsive to generating the dummy event (block 425).

Figure 5:
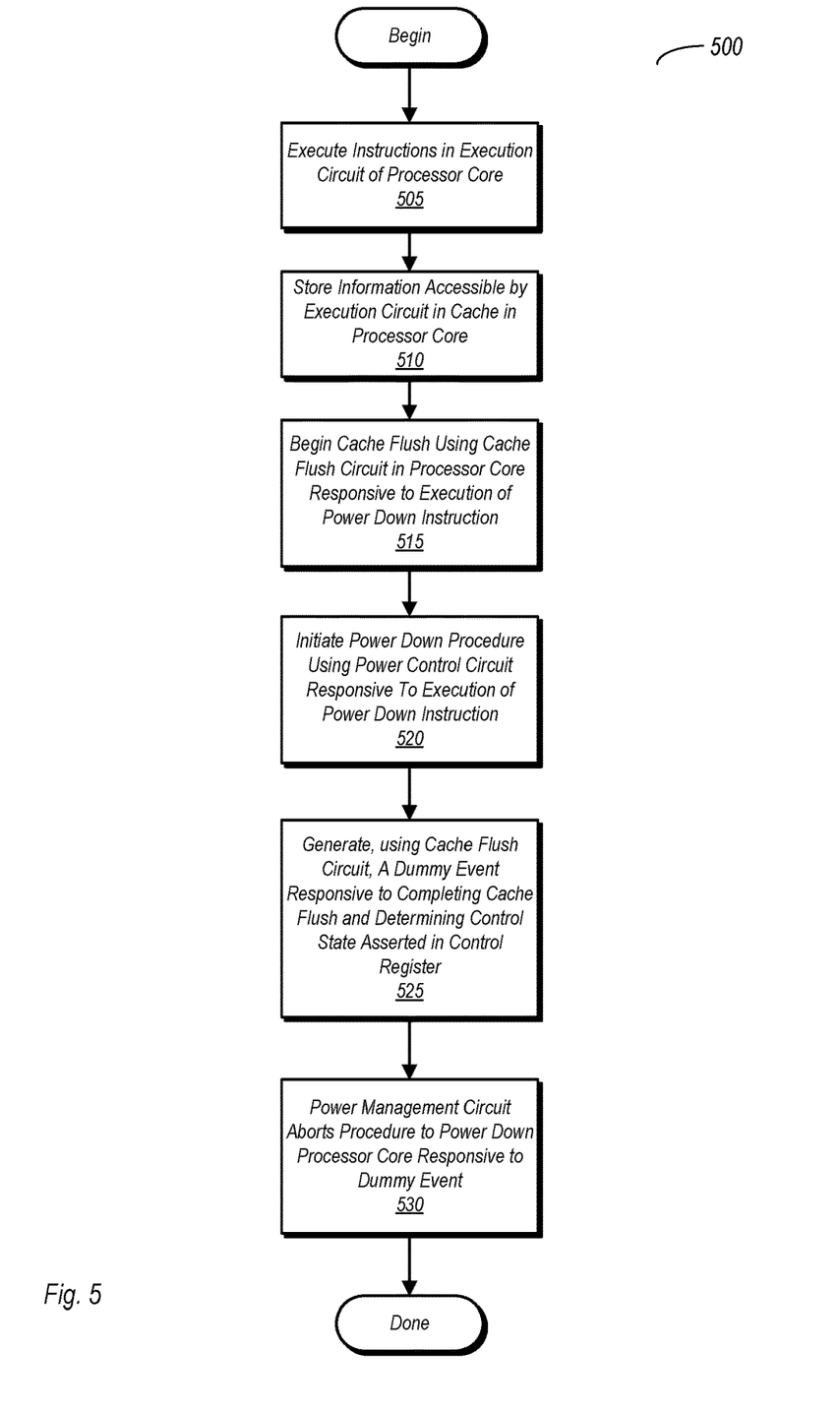
FIG. 5 is a flow diagram illustrating another embodiment of a method for operating a system having a cache flush circuit.

FIG. 5 is a flow diagram illustrating another embodiment of a method for operating a system having a cache flush circuit. Method 500 may be performed using various ones of the hardware embodiments discussed above, as well as any hardware embodiment that falls within the scope of this disclosure.

Method 500 includes executing instruction in an execution circuit of a processor core (block 505), and storing information accessible by the execution circuit in a cache in the processor core (block 510). Responsive to execution of a power down instruction by the execution circuit, the method begins performance of a cache flush using a cache flush circuit in the processor core (block 515). Additionally, the method includes initiating a power down procedure using a power control circuit responsive to execution of the power down instruction (block 520). Using the cache flush circuit, the method further includes generating a dummy event responsive to completing the cache flush and determining that a control state is asserted in a control register (block 525). Thereafter, the power management circuit aborts the procedure to power down the processor core responsive to the dummy event (block 520).

Figure 6:
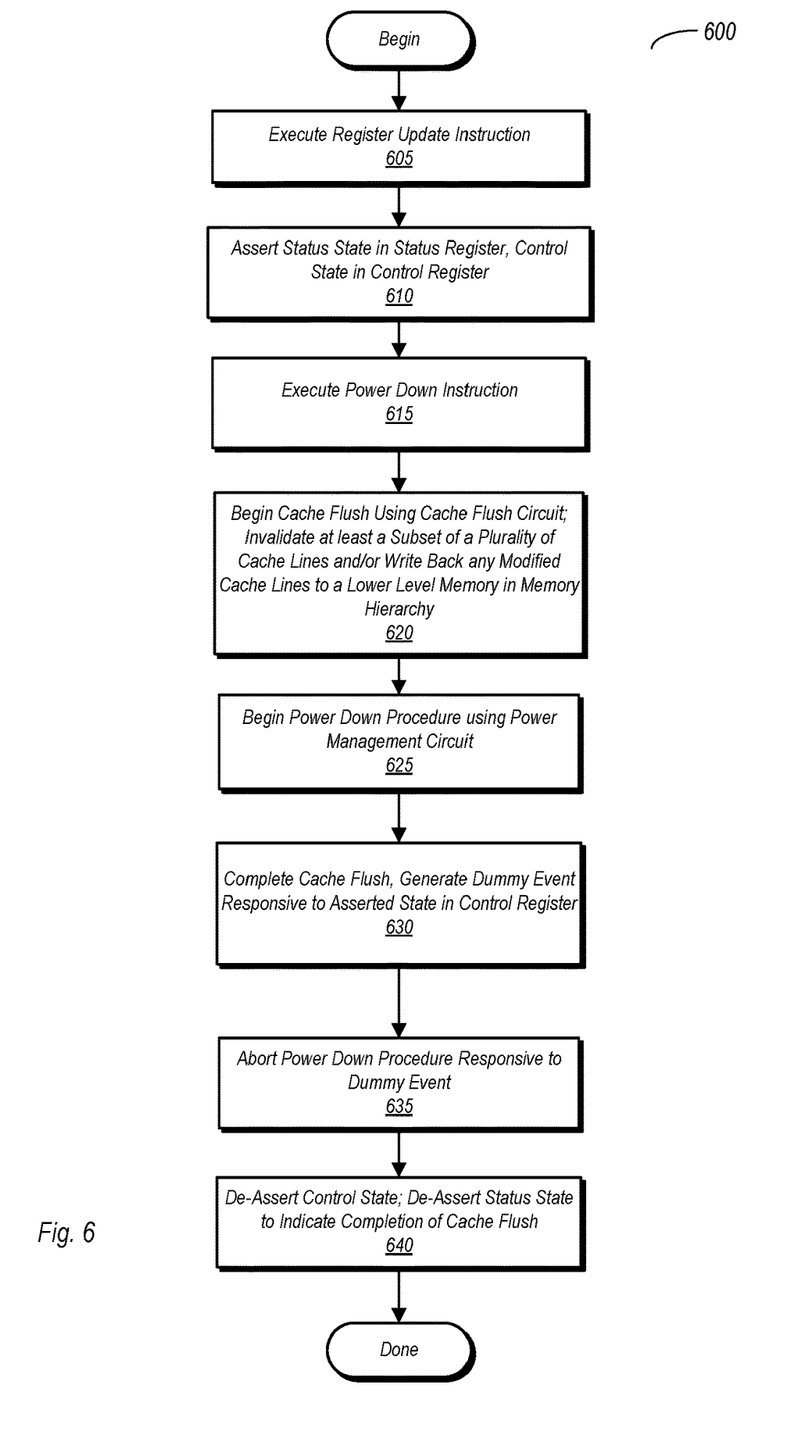
FIG. 6 is a flow illustrating another embodiment of a method for operating a system having a cache flush circuit.

FIG. 6 is a flow illustrating another embodiment of a method for operating a system having a cache flush circuit. Method 600 may be carried out by the hardware embodiments discussed above and suitably configured hardware embodiment that, while not explicitly discussed herein, fall within the scope of this disclosure.

Method 600 begins with the execution of a register update instruction (block 605) by execution circuitry. The method further includes indicating that the processor is not to be powered down subsequent to completing flushing of the cache, wherein indicating that the processor is not to be powered down comprises setting the control state responsive to execution of a register update instruction, the register update instruction being executed prior to a power down instruction, and further includes indicating that flushing the cache is not complete, which includes a status state being asserted in a status register (block 610). Asserting the status state in a status register is performed responsive to execution of the register update instruction. Thereafter, the method includes executing a power down instruction (block 615).

Responsive to execution of the power down circuit, a cache flush is begun by a cache flush circuit. Performing the cache flush includes at least one of invalidating at least a subset of a plurality of cache lines in the cache and/or writing back any modified cache lines to a lower level memory in a memory hierarchy (block 620). Concurrent with the cache flush, method 600 includes a power control circuit initiating a power down procedure, responsive to execution of the power down instruction (block 625).

Method 600 further includes completing the cache flush and generating a dummy event responsive to the asserted state in the control register, wherein generating a dummy event comprises, in one embodiment, generating an interrupt and conveying the interrupt to an interrupt handler (block 630). The power control circuit aborts the power down procedure responsive to the dummy event (block 635). Method 600 in the embodiment shown concludes with indicating completion of the cache flush, wherein indicating completion of the cache flush comprises de-asserting the status state in the status register, and also includes de-assertion of the control state in the control register (block 640).

Figure 7:
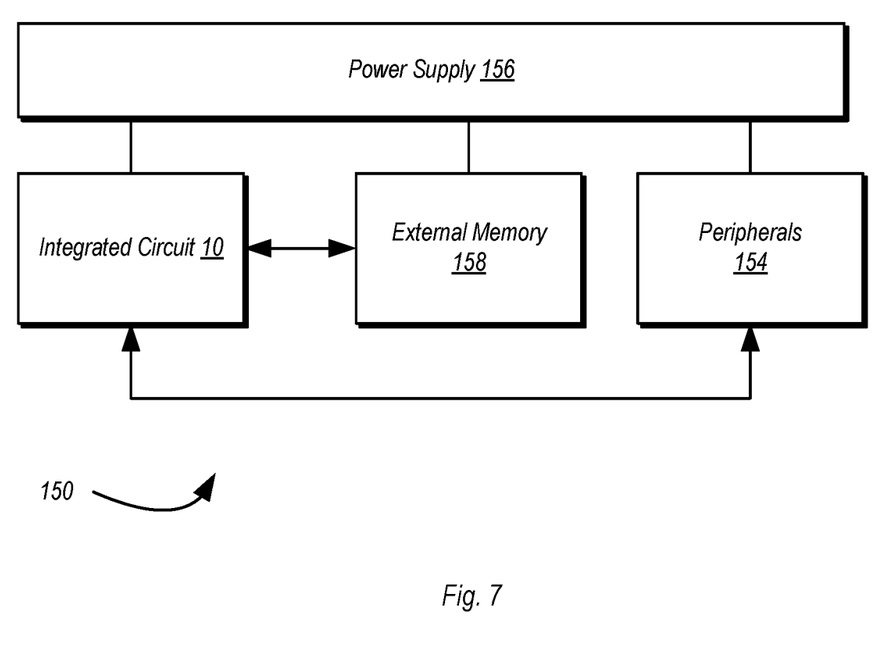
FIG. 7 is a block diagram of one embodiment of an example system.

Turning next to FIG. 7, a block diagram of one embodiment of a system 150 is shown. In the illustrated embodiment, the system 150 includes at least one instance of an integrated circuit 10 coupled to external memory 158. The integrated circuit 10 may include a memory controller that is coupled to the external memory 158. The integrated circuit 10 is coupled to one or more peripherals 154 and the external memory 158. A power supply 156 is also provided which supplies the supply voltages to the integrated circuit 10 as well as one or more supply voltages to the memory 158 and/or the peripherals 154. In some embodiments, more than one instance of the integrated circuit 10 may be included (and more than one external memory 158 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as WiFi, Bluetooth, cellular, global positioning system, etc. The peripherals 154 may also include additional storage, including RAM storage, solid-state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, tablet, etc.). In some embodiments, integrated circuit 10 may include various functional circuit blocks such as those discussed above in reference to FIGS. 1 and 2, and may thus carry out various embodiments of the methods discussed with reference to FIGS. 3-6.

The external memory 158 may include any type of memory. For example, the external memory 158 may be SRAM, dynamic RAM (DRAM) such as synchronous DRAM (SDRAM), double data rate (DDR, DDR2, DDR3, LPDDR1, LPDDR2, etc.) SDRAM, RAMBUS DRAM, etc. The external memory 158 may include one or more memory modules to which the memory devices are mounted, such as single inline memory modules (SIMMs), dual inline memory modules (DIMMs), etc.

Numerous variations and modifications will become apparent to those skilled in the art once the above disclosure is fully appreciated. It is intended that the following claims be interpreted to embrace all such variations and modifications.

What is claimed is:

1. An apparatus comprising:
an execution circuit configured to execute instructions;
a cache configured to storage information accessible by the execution circuit; and
a flush circuit coupled to the cache, wherein the flush circuit is configured to flush the cache responsive to execution of a power down instruction, and responsive to determining that a control state is asserted in a control register and completion of flushing of the cache, generate a dummy event, wherein a processor core including the execution circuit is inhibited from being powered down responsive to the dummy event.

2. The apparatus as recited in claim 1, wherein the execution circuit is configured to cause the control state to be asserted responsive to execution of a register update instruction.

3. The apparatus as recited in claim 1, further comprising a status register, wherein the execution circuit is further configured to cause a status state to be asserted in the status register responsive to execution of a cache flush instruction.

4. The apparatus as recited in claim 3, wherein the flush circuit is configured to de-assert the status state responsive to completing flushing of the cache.

5. The apparatus as recited in claim 1, wherein the dummy event is an interrupt.

6. The apparatus as recited in claim 1, wherein the flush circuit is configured to, during flushing of the cache, cause any modified stored data in the cache to be written to a lower level memory in a memory hierarchy.

7. The apparatus as recited in claim 1, wherein the cache is configured to store a plurality of cache lines, and wherein the flush circuit is configured to, during flushing of the cache, invalidate at least a subset of the plurality of cache lines.

8. The apparatus as recited in claim 1, further comprising a power management circuit configured to initiate a power down procedure responsive to execution of the power down instruction, and further configured to abort the power down procedure responsive to the dummy event.

9. A method comprising:
executing, in execution circuitry of a processor core, a power down instruction;
determining, responsive to executing the power down instruction and using a cache flush circuit, if a control state is asserted in a control register;
flushing a cache using the cache flush circuit; and
generating a dummy event, using the cache flush circuit, responsive to completing flushing of the cache and determining that the control state is asserted; and
inhibiting the processor core from being powered down responsive to generating the dummy event.

10. The method as recited in claim 9, further comprising indicating that the processor is not to be powered down subsequent to completing flushing of the cache, wherein indicating that the processor is not to be powered down comprises asserting the control state responsive to execution of a register update instruction, the register update instruction being executed prior to the power down instruction.

11. The method as recited in claim 9, further comprising indicating that flushing the cache is not complete, wherein indicating that flushing the cache is not complete comprises a status state being asserted in a status register.

12. The method as recited in claim 11, further comprising:
executing a register update instruction;
asserting the status state in a status register responsive to execution of the register update instruction; and
indicating completion of the cache flush, wherein indicating completion of the cache flush comprises de-asserting the status state in the status register.

13. The method as recited in claim 9, further comprising:
a power control circuit initiating a power down procedure responsive to execution of the power down instruction; and
the power control circuit aborting the power down procedure responsive to the dummy event.

14. The method as recited in claim 9, wherein flushing the cache comprises one or more of the following:
invalidating at least a subset of a plurality of cache lines in the cache;
writing back any modified cache lines to a lower level memory in a memory hierarchy.

15. The method as recited in claim 9, wherein generating a dummy event comprises generating an interrupt and conveying the interrupt to an interrupt handler.

16. A system comprising:
a processor core including:
an execution circuit configured to execute instructions;
a cache configured to store information accessible by the execution circuit;
and
a cache flush circuit configured to flush the cache responsive to execution of a power down instruction by the execution circuit; and
a power management circuit configured to initiate a procedure to power down the processor responsive to execution of the power down instruction;
wherein the cache flush circuit is further configured to generate a dummy event responsive to completing flushing of the cache and determining that a control state is asserted in a control register, generate a dummy event; and
wherein the power management circuit is configured to abort the procedure to power down the processor core responsive to the dummy event.

17. The system as recited in claim 16, wherein the dummy event is an interrupt.

18. The system as recited in claim 16, wherein the cache flush circuit is configured to perform one or more of the following during performing of the cache flush:
cause invalidation of at least a subset of a plurality of cache lines in the cache;
cause any modified data stored in the cache to be written to a lower level memory.

19. The system as recited in claim 16, wherein the execution circuit is further configured to:
cause the control state to be asserted in the control register responsive to execution of a register update instruction;
cause a status state to be asserted in a status register responsive to execution of the register update instruction.

20. The system as recited in claim 19, wherein the cache flush circuit is further configured to:
cause a de-assertion of the control state in the control register responsive to completing the cache flush; and
cause a de-assertion of the status state in the status register responsive to completing the cache flush.

* * * * *